(12) United States Patent
Woodbeck (10) Patent No.: US 8,200,025 B2
(45) Date of Patent: Jun. 12, 2012

(54) IMAGE CLASSIFICATION AND SEARCH

(75) Inventor: Kris Woodbeck, Ottawa (CA)

(73) Assignee: University of Ottawa, Ottawa, Ontario (CA)

( * ) Notice: Subject to any disclaimer, the term of this patent is extended or adjusted under 35 U.S.C. 154(b) by 1221 days.

(21) Appl. No.: 11/952,643

(22) Filed: Dec. 7, 2007

(65) Prior Publication Data

US 2009/0148068 A1  Jun. 11, 2009

(51) Int. Cl.
*G06K 9/62* (2006.01)
(52) U.S. Cl. ............................ 382/224; 382/159; 706/20
(58) Field of Classification Search .................. 382/159, 382/224–228; 706/20
See application file for complete search history.

(56) References Cited

U.S. PATENT DOCUMENTS

| | | | |
|---|---|---|---|
| 5,751,286 A | 5/1998 | Barber et al. |
| 5,893,095 A | 4/1999 | Jain et al. |
| 5,911,139 A | 6/1999 | Jain et al. |
| 5,913,205 A | 6/1999 | Jain et al. |
| 5,963,670 A | 10/1999 | Lipson et al. |
| 5,983,237 A | 11/1999 | Jain et al. |
| 6,084,595 A | 7/2000 | Bach et al. |
| 6,256,409 B1 | 7/2001 | Wang |
| 6,418,430 B1 | 7/2002 | DeFazio et al. |
| 6,445,834 B1 | 9/2002 | Rising, III |
| 6,563,959 B1 | 5/2003 | Troyanker |
| 6,567,551 B2 | 5/2003 | Shiiyama |
| 6,611,623 B2 | 8/2003 | Konishi et al. |
| 6,687,416 B2 | 2/2004 | Wang |
| 6,711,293 B1 | 3/2004 | Lowe |
| 6,718,075 B1 | 4/2004 | Yamamoto |
| 6,865,302 B2 | 3/2005 | Chang |
| 6,895,104 B2 | 5/2005 | Wendt et al. |
| 6,917,703 B1 | 7/2005 | Steffens et al. |
| 7,006,689 B2 | 2/2006 | Kasutani |
| 7,006,714 B2 | 2/2006 | Kasutani |
| 7,016,532 B2 | 3/2006 | Boncyk et al. |
| 7,031,555 B2 | 4/2006 | Troyanker |
| 7,127,452 B1 | 10/2006 | Yashiro |

(Continued)

FOREIGN PATENT DOCUMENTS

WO   WO2004015590 A2   2/2004

(Continued)

OTHER PUBLICATIONS

Jay Hegde and David C. Van Essen, Selectivity for complex shapes in primate visual area v2, The Journal of Neuroscience, 2000, vol. 20 RC61, 1 of 6.

(Continued)

*Primary Examiner* — Aaron W Carter
(74) *Attorney, Agent, or Firm* — Peter A. Nieves; Sheehan Phinney Bass + Green PA (57) ABSTRACT

An electronic image classification and search system and method are provided. Images are processed to determine a plurality of simple feature descriptors based upon characteristics of the image itself. The simple feature descriptors are grouped into complex features based upon the orientation of the simple feature descriptors. End-stopped complex feature descriptors and complex feature descriptors at multiple orientations are grouped into hypercomplex feature descriptors. Hypercomplex resonant feature descriptor clusters are generated by linking pairs of hypercomplex feature descriptors. Feature hierarchy classification can then be performed by adaptive resonance on feature descriptors and classifier metadata associated with the image can then be generated to facilitate indexing and searching of the image within a hierarchical image database.

19 Claims, 10 Drawing Sheets

U.S. PATENT DOCUMENTS

| | | | |
|---|---|---|---|
| 7,184,577 B2 | 2/2007 | Chen et al. | |
| 7,274,834 B2 | 9/2007 | Hung | |
| 7,333,963 B2 * | 2/2008 | Widrow et al. | 706/18 |
| 7,606,777 B2 * | 10/2009 | Serre et al. | 706/20 |
| 8,037,010 B2 * | 10/2011 | Jaros et al. | 706/62 |
| 2002/0184203 A1 | 12/2002 | Naster et al. | |
| 2003/0231806 A1 | 12/2003 | Troyanker | |
| 2004/0098399 A1 | 5/2004 | Risberg et al. | |
| 2004/0109608 A1 | 6/2004 | Love et al. | |
| 2005/0185060 A1 | 8/2005 | Neven | |
| 2005/0271304 A1 | 12/2005 | Retterath et al. | |
| 2006/0190445 A1 | 8/2006 | Risberg et al. | |
| 2007/0047802 A1 | 3/2007 | Puri | |
| 2007/0230801 A1 | 10/2007 | Sinclair et al. | |
| 2008/0071710 A1 * | 3/2008 | Serre et al. | 706/20 |
| 2008/0071712 A1 * | 3/2008 | Cecchi et al. | 706/20 |

FOREIGN PATENT DOCUMENTS

| | | |
|---|---|---|
| WO | WO2005022365 A2 | 3/2005 |
| WO | WO2005106786 | 11/2005 |
| WO | WO2007/026951 A1 | 8/2007 |
| WO | WO2007/004519 A1 | 11/2007 |

OTHER PUBLICATIONS

David Hubel and Torsten Wiesel, Receptive fields and functional architecture in two nonstriate visual areas (18 and 19) of the cat, The Journal of Neurophysiology, 28 (2): 229. (1965).

Maximilian Riesenhuber and Tomaso Poggio, Hierarchial models of object recognition in cortex, Nature Neuroscience, vol. 2, No. 2, pp. 1019-1025, Nov. 1999.

Thomas Serre, Lior Wolf and Tomaso Poggio, Object recognition with features inspired by visual cortex, CVPR 2005, pp. 1-7.

Manuel Soriano, Lothar Spillman and Michael Bach, The abutting grating illusion, Vision Res. vol. 36, No. I, pp. 109-116, 1996.

Jim Mutch and David G. Lowe, Multiclass object recognition with sparse, localized features, CVPR 2006, pp. 1-8.

Akiyuki Anzai, Xinmiao Peng and David C. Van Essen, Neurons in Monkey visual area v2 encode combinations of orientations, Nature Neuroscience, vol. 10, No. 10, pp. 1313-1321, Oct. 2007.

Geoffrey M. Boynton and Jay Hegde, Visual cortex: The continuing puzzle of area v2, Current Biology, vol. 14, R523-R524, Jul. 13, 2004.

Gall A. Carpenter and Stephen Grossberg, Art 3: hierarchical search using cemical transmitters in self-organizing pattern recognition architecture, Neural Networks, vol. 3, pp. 129-152, 1990.

Kunihiko Fukushima, Neocognitron: A self-organizing neural network model for a mechanism of pattern recognition unaffected by shift in position, Biological Cybernetics 36, 193 202 (1980).

Geoffrey J. Goodhill and Miguel A. Carreira-Perpinan, Cortical columns, Apr. 8, 2002, Encyclopedia of Cognitive Science, MacMillan Publishers Ltd.

Kalanit Grill-Spector and Rafael Malach, The human visual cortex, Annu. Rev. Neuroscience, 2004. 27:649-77.

M.E.J. Wood, O. Campbell and B.T. Thomas, Searching large image databases using radial-basis function neural networks Image Processing and Its Applications, 1997., Sixth International Conference on vol. 1, Jul. 14-17, 1997 pp. 116-120 vol. 1.

J.R. Bach, S. Paul and R. Jain, A visual information management system for the interactive retrieval of faces, Transactions on Knowledge and Data Engineering vol. 5 Issue: 4 Aug. 1993 pp. 619-628.

D.G. Lowe, Object recognition from local scale-incariant features, Computer Vision, 1999. The Proceedings of the Seventh IEEE International Conference on vol. 2, Sep. 20-27, 1999 pp. 1150-1157 vol. 2.

S. Mavandadi and P. Aarabi, Rotation Invariance Images, Speech and Signal Processing, 2007. ICASSP 2007. IEEE International Conference on vol. 1, Apr. 15-20, 2007 pp. I-637-I-640.

Yanhui Bi, Yunjie Zhang and Ying Chen, Image Classification Method Based on Cellular Automata Transforms Intelligent Control and Automation, 2006. WCICA 2006. The Sixth World Congress on vol. 2, Jun. 21-23, 2006 pp. 10058-10062.

Shou-Bin Dong; Yi-Ming Yang, Hierarchical web image classification by multi-level features Machine Learning and Cybernetics, 2002. Proceedings. 2002 International Conference on vol. 2, Nov. 4-5, 2002 pp. 663-668 vol. 2.

* cited by examiner

IMAGE CLASSIFICATION AND SEARCH

TECHNICAL FIELD

The present invention relates to image search techniques and in particular to image analysis and classification to improve searching.

BACKGROUND

The growth of the Internet and the ability to acquire and retrieve digital content has increased the need for the ability to intelligently access images. Current image search technologies are based either on metadata such as keywords or image features such as overall image features such as RGB or brightness histograms. In addition, the search results are only as good as the keyword provided and the accuracy of the keywords in the database. Although humans can easily determine similarities between images and categorize images, computer systems to date have not provided efficient searching means to deal with large image collections. Current image search technology provide very poor search results with many of the displayed images representing unrelated content and the limited processing speed relegates relevance based image search engines to desktop applications where collections are limited in size.

Accordingly, an improved systems and methods that enable classification and searching of images in an efficient and accurate manner remains highly desirable.

SUMMARY

The disclosure provides a method and system for image classification of images based upon feature descriptors. The feature descriptors are utilized to generate classifiers which define a hierarchical classification structure within an image database. The classification enables efficient search of the image database to determine image containing similar content.

Thus, an aspect provides a method classifying an image comprising the steps of: determining a plurality of simple feature descriptors based upon characteristics of the image; grouping simple feature descriptors into complex features wherein the simple feature descriptors are grouped based upon orientation; grouping end-stopped complex feature descriptors and complex feature descriptors at multiple orientations into hypercomplex feature descriptors; generating a hypercomplex resonant feature descriptor cluster by linking pairs of hypercomplex feature descriptors; performing feature hierarchy classification by adaptive resonance on feature descriptors; and generating classifier metadata associated with the image.

A further aspect provides a system for image classification and searching comprising: a processor; a memory containing instructions for: a feature extractor module for: determining a plurality of feature descriptors based upon characteristics of the image; grouping feature descriptors into complex features wherein the feature descriptors are grouped based upon orientation; grouping end-stopped complex features and complex features at multiple orientations into hypercomplex features; generating a hypercomplex resonant feature cluster by linking pairs of hypercomplex features; a resonant classifier module for: performing feature hierarchy classification by adaptive resonance on feature descriptors; generating a feature image classifiers based upon the adaptive resonance classifiers; an indexing module for indexing the image within the classifier hierarchy; a storage device containing an image database comprising: classifier metadata associated with images; indexing data comprising image location data.

In yet another aspect provides a system for image classification and searching comprising: a processor; a memory containing instructions comprising: determining a plurality of simple feature descriptors based upon characteristics of the image; grouping simple feature descriptors into complex features wherein the simple feature descriptors are grouped based upon orientation; grouping end-stopped complex feature descriptors and complex feature descriptors at multiple orientations into hypercomplex feature descriptors; generating a hypercomplex resonant feature descriptor cluster by linking pairs of hypercomplex feature descriptors; performing feature hierarchy classification by adaptive resonance on feature descriptors; and generating classifier metadata associated with the image.

In still yet another aspect provides a computer readable medium containing instructions for image classification, the instructions which when executed on a processor perform the steps of: determining a plurality of simple feature descriptors based upon characteristics of the image; grouping simple feature descriptors into complex feature descriptors wherein the simple feature descriptors are grouped based upon orientation; grouping end-stopped complex feature descriptors and complex feature descriptors at multiple orientations into hypercomplex feature descriptors; generating a hypercomplex resonant feature descriptor cluster by linking pairs of hypercomplex feature descriptors; performing feature hierarchy classification by adaptive resonance on feature descriptors; and generating classifier metadata associated with the image.

Other aspects and features will become apparent to those ordinarily skilled in the art upon review of the following description of specific embodiments of the invention in conjunction with the accompanying figures.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments are described below, by way of example only, with reference to FIGS. 1-10. A system and method are provided for enabling efficient image searching.

In contrast to the typical keyword or metadata based image search engine, computer vision systems have become quite adept at recognizing objects that they have already seen, but the more general task of recognizing a class from a limited number of instances has proven somewhat elusive. Existing image classification systems are generally implemented on Single Instruction Single Data (SISD) processors, but given the complexity of the problem and raw processing power required to create a visual index, a more parallel processor is clearly required to achieve high performance. The adoption of highly parallel programmable Single Instruction Multiple Data (SIMD) processor programming architectures in applications such as Graphics Processing Unit (GPU) has provided an inexpensive architecture for emulating many highly parallel processes.

Many operations in image processing are fundamentally Single Instruction Multi Data (SIMD) in nature, where local regions of an image all have identical operations performed on them. These operations can include convolution operations, or various forms of pooling mechanisms to construct higher order visual feature descriptors from more simple feature descriptors.

A crucial aspect of object recognition is that many object classes cannot be recognized using only small, isolated regions of the image. It is important to pool simple feature descriptors in more complex feature descriptors, which requires an effective method of grouping local feature descriptors that belong to the same object together; ideally each descriptor should be aligned with the intrinsic geometry of the object in question. By grouping descriptors and determining multiple classifiers for each image a hierarchical database can be created that enables fast and efficient image search results.

Biological systems, such as the primate visual cortex, have both high speed and remarkably robust methods for achieving high accuracy object recognition over very large collections of data. Computer based object recognition systems drastically underperform when compared to biological system, mainly in terms of speed, accuracy and database size. The system presented here has a large degree of biological motivation. Each feature descriptor represents an entire class of cells present in the human visual cortex and the classifier also has a strong biological basis. SIMD processors are fundamentally similar to these biological systems and allows computationally intense operations to be performed efficiently.

Figure 1:
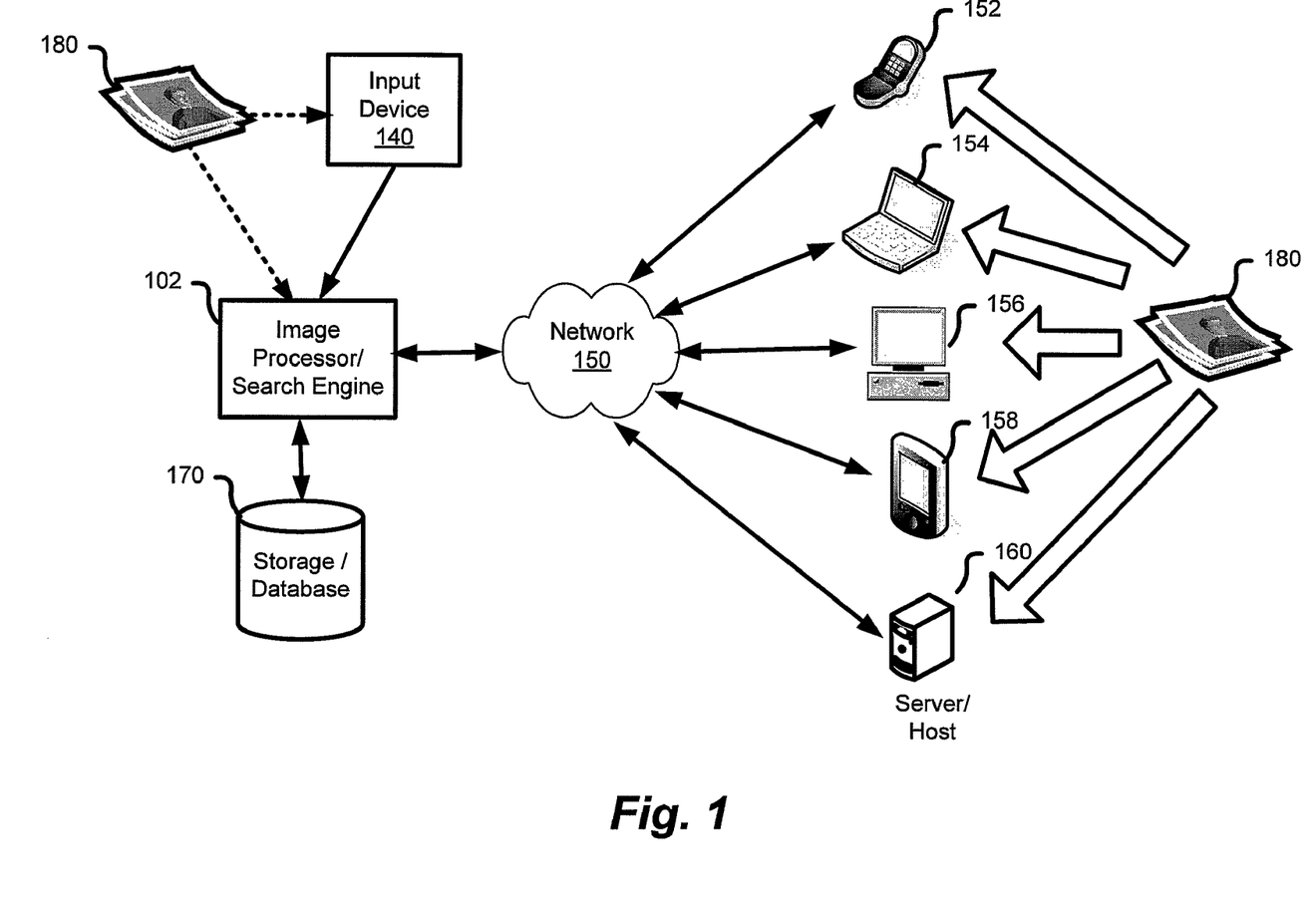
FIG. 1 shows an overview of a system for image searching.

FIG. 1 shows an overview of a system for image searching. Digital images 180 can be stored or acquired from a number of locations or devices. A network 150 such as for example the internet provides a medium to enable a user to generate, store and locate images. The images may be stored on a server or host 160, such as for example a website, on digital devices such as mobile phones 152, notebook computers 154, desktop computers 156, personal digital assistants 158. In addition these devices may acquire from or include cameras that generate images 180. To facilitate access to images, either stored locally or distributed throughout the network an image processor/search engine 102 is provided. The image processor and search engine may be embodied in a single device or may be functional distributed across multiple devices in software or hardware form. The image processor 102 receives images which are classified based upon characteristics or feature descriptors of the images, as will be discussed in more detail. Analysis is performed on the feature descriptors which enables classifications to be associated with the image. The classifier metadata can then be utilized to create a hierarchical database 170 to facilitate searching. Images 180 may also be input directly into the image processor 102 or acquired through an input device 140 such as a scanner or digital camera. Once a database and index have been created, searches can be performed through the search engine, either local or remotely through the network 150. The searches can be initially based upon keywords that are associated with each of the images or based upon analysis of a provided or selected image to determine relevant characteristics. The search engine can then retrieve location data from the database 170 and present relevant image results to the user. By providing a means of a search based upon keywords in addition to determined visual characteristics of the image, a more refined and efficient image database structure is provided which can ensure faster more accurate search results.

Figure 2:
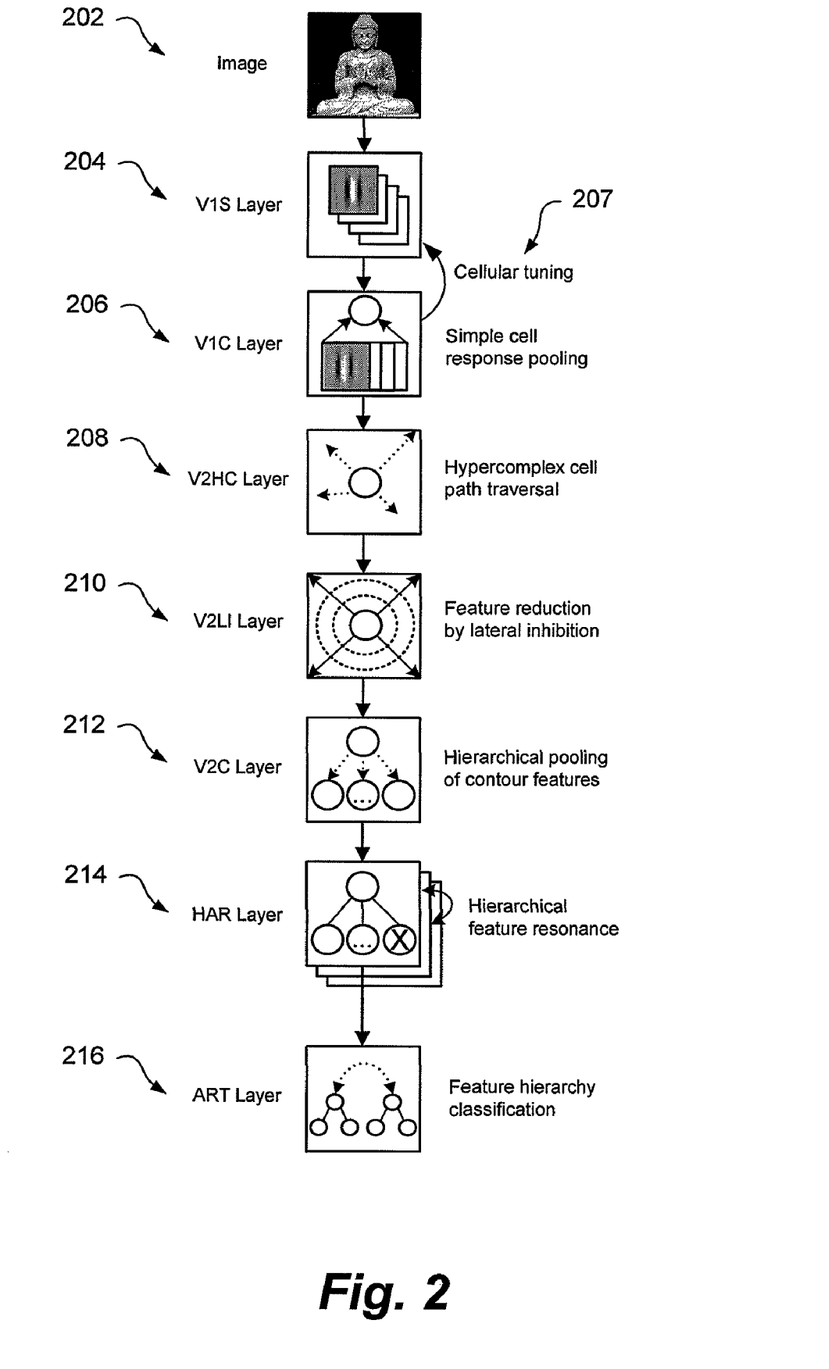
FIG. 2 shows a schematic representation of image classification and search model.

The image classification starts with simple and complex feature descriptors, as shown in FIG. 2, which provides a schematic representation of an image classification and search model. Simple feature descriptors are created using a convolution operations with Gabor filters on a received image. Complex feature descriptors are pooled from simple feature descriptors of a given orientation. Pooling is modeled as a MAX operator and happens over all scales and over all positions within the feature descriptors' scope, also known as a receptive field. Simple and complex feature descriptor computation is alternated and their receptive fields gradually grow in size.

Another type of feature used is the hypercomplex feature descriptor. This feature descriptor is built around several key structures in the system. The first of which is simple and complex feature descriptors, which are extracted in an alternating fashion. The cortical column structure is used, as shown in FIG. 2, in order to group simple feature descriptors with similar properties that vary only by orientation and is used to regulate the feature tuning process. The hypercomplex feature descriptor serves to pool complex feature descriptors into simple orientation and scale invariant feature descriptors. Another type of feature descriptor is used, which pools hypercomplex feature descriptors and links them in a hierarchical manner. A method of comparing hierarchical feature descriptors and of isolating the pertinent feature descriptors for a class is also provided.

Image classification is performed using a hierarchical resonant classifier. Note that all feature data, meaning all system input and output, can be stored in texture format when a GPU is used during all stages of processing.

FIG. 2 shows illustratively the layers of the image classification and search model. An image 202 is acquired by the system. The image may be presented in any number of image formats such as .JPG, GIF, RAW or may be selected from multimedia files such as MPG, AVI, .MOV, etc. Any computer definable image format may be utilized for processing by the system.

V1 Simple Features (V1S Layer) (204)

The V1S layer 204 is computed directly from the image 202 with a convolution using 2D Gabor filters over a range of orientations, for example four unique orientations. The Gabor filters have the ranges show in Table 1 and can be described by:

$$C_S(\theta, x, y) = \exp\left(-\frac{x_1^2 + \gamma^2 y_1^2}{2\sigma^2}\right)\cos\left(2\pi\frac{x_1}{\lambda} + \psi\right)$$

Where $\begin{aligned} x_1 &= x\cos(\theta) + y\sin(\theta) \\ y_1 &= y\cos(\theta) - y\sin(\theta) \end{aligned}$ $\sigma$ and $\lambda$ are related by the bandwidth parameter b from Equation (2)

The system uses parameters within the ranges shown in Table 1. The initial values of the parameters are inserted in the filters, but the final filter values obtained for each image are not pre-determined. A tuning operation is used to dynamically select the optimal Gabor filters for the current image. The initial values of the parameters can be for example:

$\psi=0.0$, $\sigma=0.7$, $\gamma=0.6$, $b=1.1$, but the final filter values are obtained with the use of a tuning operation which dynamically selects the optimal simple feature parameters for each image. This procedure is explained below.

TABLE 1

| Parameter | scale | θ | ψ | b | γ | λ |
|---|---|---|---|---|---|---|
| Value Range | [5, 31] | $0, \frac{\pi}{4}, \frac{\pi}{2}, \frac{3\pi}{4}$ | $[-\frac{\pi}{2}, \frac{\pi}{2}]$ | [0.2, 3.0] | [0.0, 3.0] | [0.0, 6.0] |

V1 Complex Features (V1C Layer) (206)

V1 complex feature descriptors are derived with a pooling operation over a local cluster of simple features descriptors within the complex feature descriptors receptive field, $\sigma_{RF}$. The pooling is modeled with a MAX operation. Complex feature descriptors are pooled from a cluster of simple feature descriptors of a common orientation, θ, although other forms of pooling may be utilized. Let $C_S(s_i,\theta,x,y)$ be the simple feature descriptor at (x,y) with orientation θ and scale $s_i$. The complex feature descriptor pooling operation is defined in Equation 3.

$$C_C(\theta,x,y)=\max\{C_S(\theta,x+x',y+y')|\forall(x',y')\epsilon\sigma_{RF}\} \quad (3)$$

Complex features descriptors can be thought of as a type of sub-sampling operation: a complex feature descriptor with a given receptive field $\sigma_{RF}$ reduces a group of simple feature descriptors within its receptive field to a single feature descriptor. Note that any given complex feature descriptor $C_c^i$ has a specific orientation $\alpha_i$ that is derived from the object in the visual field; $\alpha_i$ is closely related to the simple feature descriptor's θ parameter. α is used to achieve rotation invariance and is explained further in the V2HC layer 208.

Columnar Tuning (207)

Selecting the best simple feature descriptors with which to process a given visual field is not a simple problem to solve: there are countless combinations of parameters for simple feature descriptor extraction. Many systems use static Gabor filters for feature extraction, but the disclosed model does away with this assumption. Simple feature parameters are selected using an iterative tuning model. The results of this tuning process 207 are the ideal set of simple feature parameters with which to process the image and is summarized as follows:

1. The system is initialized with default simple feature values;
2. Tuning takes place over the following V1 simple feature parameters: γ,ψ,b,λ;
3. There are N tuning steps, with M simple feature settings tested at each step;
4. At each tuning step, a new series of simple feature descriptors are generated by altering the current simple feature parameter;
5. All M newly generated simple feature descriptors are extracted from the visual field;
P 6. The results from the M simple feature descriptors are evaluated based on the ratio of cortical columns and complex feature descriptors;
7. The parameters that create the optimal ratio of corners to edges while maximizing corners are selected as the winning parameters; and
8. The tuning process is repeated N times.

Generally, there is an increase of feature receptive field size throughout the tuning process. Due to the fact that 4NM total convolutions are performed per visual field, the tuning is only plausible if done using hardware capable of SIMD computation, such as the GPU.

V2 Hypercomplex Features (V2HC Layer) (208)

Illusory contours of objects are an important property for requiring complex shapes and textures. Hypercomplex feature descriptors pool over multiple orientations; they pool over the orientation component of complex feature descriptors. Hypercomplex feature descriptors pool over complex feature orientation and respond to end-stopped input (bars of a specific length). These properties are accommodated by designing hypercomplex feature descriptors to be pooled from specific complex feature descriptors. The hypercomplex feature descriptors pool both end-stopped complex feature descriptors and complex feature descriptors at multiple orientations. This allows hypercomplex feature descriptors to activate for simple shapes, such as that of a corner or chevron.

These features serve as the basis for representing an object's geometry, although any single hypercomplex feature descriptor is too simple to accurately identify a given object; they must be pooled yet again to provide a reliable basis for object recognition. Equation 4 shows an orientation pooling hypercomplex feature descriptors; this features descriptor is comprised of all active complex features in its receptive field. The hypercomplex feature descriptor orientation pooling operation can be defined as follows:

$$C_H(x,y)=\{C_C(\theta_i,x,y):\theta_i\epsilon 2\pi, C_C(\theta_i,x,y)>t_{act}\} \quad (4)$$

Figure 3:
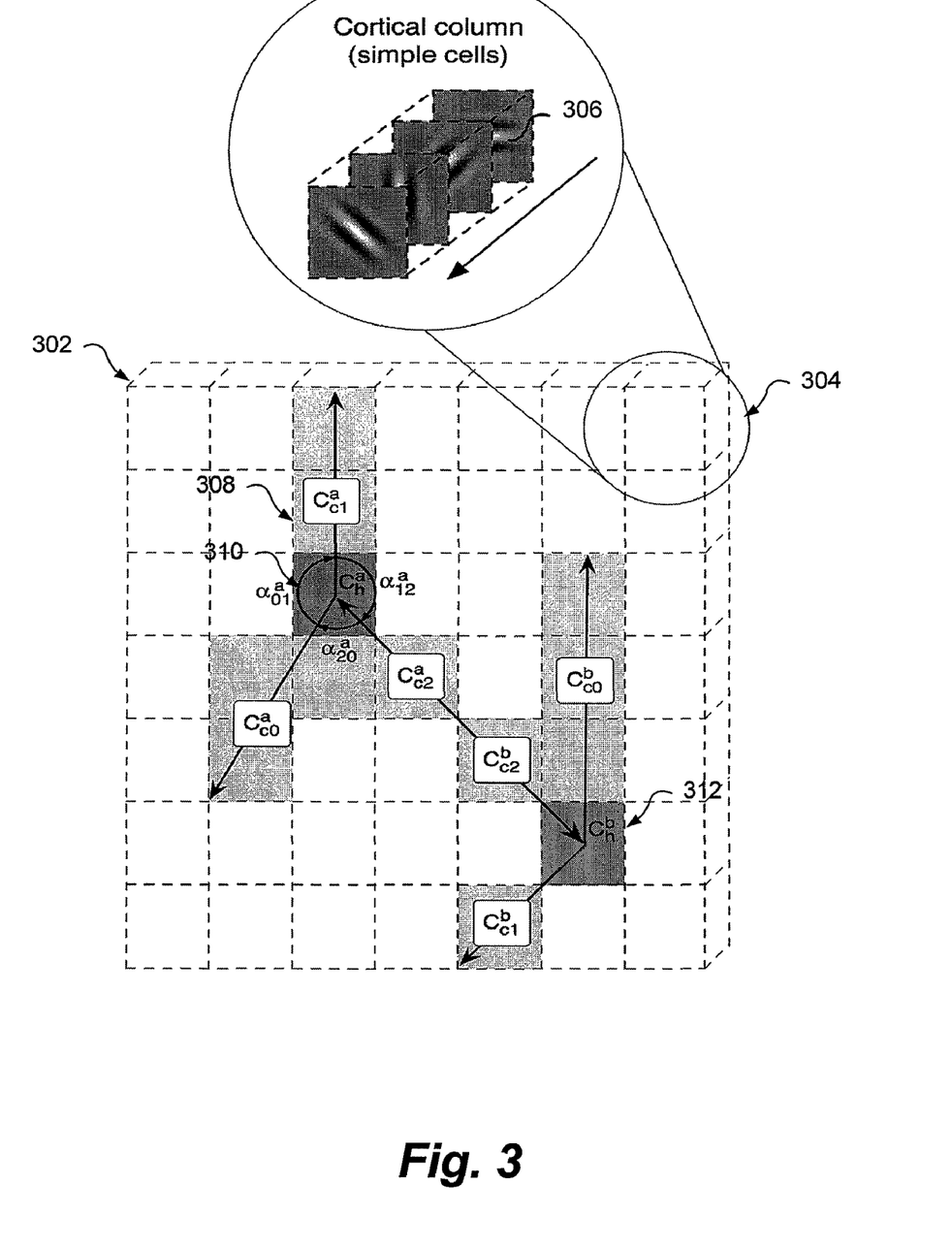
FIG. 3 shows an illustration of interaction between feature descriptors during image classification.

$t_{act}$ is an activation threshold and is set to 10% of the maximum response value. A hypercomplex feature descriptor $C_{HA}$ is comprised of the responses of active complex feature descriptors $C_{C0}^A \ldots C_{CN}^A$. Hypercomplex features descriptors are normalized in a manner that gives them both orientation and scale invariance. The activation of any complex feature $C_{CI}^A$, has an intrinsic orientation associated with it, $\alpha_i$, which is related to the simple feature θ value. $\alpha_i$ reflects the orientation of the item in the visual field activating the underlying simple feature descriptor. FIG. 3 shows an illustration of interaction between features during image classification. The difference in angle between any two complex features is $\alpha_{ij}=\text{abs}(\alpha_i-\alpha_j)$. A hypercomplex feature descriptor is normalized by comparing the orientation of all of its complex feature descriptors and setting the largest $\alpha_{ij}$ as the primary angle and $C_{CI}^A$ as the primary complex feature. The remaining complex feature descriptors are arranged in a clockwise manner from the primary for future comparison.

Each complex feature descriptor $C_C$ has a length associated with its activation, dictated by $\sigma_{RF}$ and $s_i$. The lengths are also normalized according to the $\sigma_{RF}$ and $s_i$ values of each hypercomplex feature descriptors' longest complex feature descriptor. These steps give the feature descriptors complete rotation and scale invariance. Once rotation and scale normalization has taken place, $C_H^A$, comprised of $C_{C0}^A \ldots C_{CN}^A$, has the following properties:

- $\alpha_{01}$ is the largest angle difference between any of the complex feature descriptors
- $C_{C0}^A$ is the primary complex feature descriptor
- $C_{C1}^A$ is the closest complex feature descriptor to $C_{C0}^A$ in a clockwise manner
- A normalized length is stored for each complex feature descriptor in $C_H^A$ The comparison of two complex feature descriptors is given in Equation 5, and the comparison of two hypercomplex feature descriptors is shown in Equation 6.

$$\|C_{CI} - C_{CJ}\| = \sqrt{(C_{CI} - C_{CJ})^T P(C_{CI} - C_{CJ})} \quad (5)$$

$$\|C_{HI} - C_{HJ}\| = \sqrt{\sum_{k=0}^{N} \frac{\|C_{CI} - C_{CJ}\|^2}{\sigma_i^2}} : C_{CI} \in C_{HI}, C_{CJ} \in C_{HJ} \quad (6)$$

The comparison operator for hypercomplex feature descriptors defines a quick and effective method of comparing both the orientation and length components of the constituent complex feature descriptors within two hypercomplex feature descriptors. This raises the issue of how to separate foreground from background, since a hypercomplex feature descriptor can contain complex features descriptor from both the foreground and background. Physiologically, having two eyes aids us greatly in determining object boundaries: depth is a very obvious cue. But in most computer vision problems two views of a given scene are not provided, so other techniques must be employed to isolate an object of interest from its background. This problem is dealt with in the V2C layer.

V2 Lateral Inhibition (V2LI Layer) (210)

The visual field now consists of a set of hypercomplex feature descriptors whose receptive fields overlap one another, leaving redundant features in the visual field. Lateral inhibition is a mechanism whereby a given feature descriptor inhibits neighboring feature descriptors with lower activation levels. This inhibitory mechanism makes use of the paths defined by complex feature descriptors within hypercomplex feature descriptors. As in previous models, lateral inhibition or feature sparsification has been shown to help to effectively isolate the important features within the visual field. The inhibitory mechanism utilized allows each hypercomplex feature descriptor to inhibit the response of neighboring feature descriptors within its receptive field. The inhibition occurs over the activation of simple feature descriptors and the mechanism acts as a MAX operator, similar in nature to the V1 complex feature descriptor.

V2 Hierarchy Building (V2C Layer) (212)

Once lateral inhibition has taken place, the visual field consists of a collection of hypercomplex feature descriptors pooled from complex feature descriptors. The next stage is to introduce higher order feature descriptors by pooling the hypercomplex feature descriptors one step further. Another type of feature descriptor is defined whose properties are quite similar to the feature descriptors in the lower levels: it is yet another type of pooling operation. This pooling is geared towards activation from object contours.

This feature pools the response of hypercomplex feature descriptors to form a graph of features. Let $(C_{HA}, C_{HK})$ be two hypercomplex feature descriptors that are linked together by a shared complex feature descriptor, meaning that the common complex feature descriptor is in both hypercomplex features. This link is activated if and only if they share a complex feature descriptor. In order to achieve this state, each hypercomplex feature descriptor has all of its constituent complex features' receptive fields traversed in order to determine all neighboring hypercomplex feature descriptors; the end result is the resonant feature descriptor $C_r^a$, shown in Equation 7.

$$C_R(x,y) = \{(C_{HA}, C_{HK}) \exists I, J, K, C_{CI} \in C_{HA}, C_{CJ} \in C_{HK} : \|C_{CI} - C_{CJ}\| = 0\} \quad (7)$$

$C_R$ is a tree graph with a depth of 1. A sample of such a resonant feature descriptors can be seen in FIG. 3. This pooling operation links pairs of hypercomplex feature descriptors together in a 1st order hierarchy, allowing hypercomplex feature descriptors to become members of a common graph. The graph activates in response to illusory contours due to its ability to link feature descriptors within a specific receptive field, but one problem remains: the graph contains a good deal of noise. The ideal resonant hypercomplex feature descriptor will activate to a contour whose elements have a common luminance.

FIG. 3 provides a simplified sample of a single Hierarchical Resonant image feature. $C_r^a$, comprised of 2 hypercomplex feature descriptors ($C_h^a$ and $C_h^b$) and 5 complex feature descriptors ($C_{c0}^a \ldots C_{c2}^a$ and $C_{b0}^b \ldots C_{c2}^b$). Note that the grid 302 represents a field of simple feature cortical columns on top of which complex feature descriptor pooling occurs. In feature 304, contains 4 simple feature 306 each providing a different orientation. This grid is in turn mapped onto a series of textures on the GPU. The primary complex feature descriptors, 310 and 31, $C_{c0}^a$ and $C_{c0}^b$, are associated with the largest angles in their respective hypercomplex feature descriptors; all other feature descriptors are arranged in a clockwise manner in order to simplify rotation invariant matching. The complex feature lengths are also normalized for invariance during matching.

Hierarchical Resonance (HAR Layer) (214)

The visual field now consists of a large number of 1st order hierarchies of hypercomplex feature descriptors; however, every feature descriptor hierarchy can consist partially or completely of background information. The HAR Layer 214 serves to set weights for the feature pairs in each hierarchy based on its ability to match other feature hierarchies of the same object class. The hierarchical resonance (HAR) layer 214 performs this resonance operation over all visual fields for a given object class, it effectively performs feature descriptor isolation prior to training the classifier. The resonance operation is done over all feature descriptors in the training set for a given class; it is effectively selecting both the best feature descriptor hierarchies and the best elements of these hierarchies to recognize a specific class. The result of this layer is a set of hierarchical feature descriptors which activate in response to a specific class.

Let $C_r^a$ be a resonant feature composed of hypercomplex feature descriptors $C_{h0}^a \ldots C_{hN}^a$. Let $C_r^b$ be a resonant feature descriptor from a separate visual field. The following code shows an algorithm for comparing two resonant feature descriptors to one another. The discardChildren function serves to discard the least similar hypercomplex child feature descriptors so that the two feature descriptors have the same child count. This helps to isolate background features.

The following code shows the comparison algorithm for comparing two hypercomplex feature descriptors, ($C_r^a$) and ($C_r^b$). In the same way as all layers in the system, it runs as pixel/fragment shader code on the GPU.

```
if childCount(C_r^a) < childCount(C_r^b) then
    C_r^b ← discardChildren(C_r^b)
end if
if childCount (C_r^a) = childCount(C_r^b) then
    rootAct ← ||C_{h0}^a - C_{h0}^b||
    if rootAct > ρ then
        for k = 1 to childCount(C_r^a) do
            weight[i] ← rootAct × ||C_{hk}^a - C_{hk}^b||
        end for
    end if
end if
```

This matching process is run on every feature descriptor combination in two input images. For each $C_r^a$, the best matching feature descriptor is selected (via the max operator) in the destination image. Following this, the p parameter, whose range is [0,1], is used to dictate the success of matches within the child weight values. The process is repeated for all images within a class for positive examples, and a set of background images for negative examples. All weights and features are extracted and stored in a database for use by the classifier.

Classification (GPU ART Layer) (216)

The classifiers belong to the Adaptive Resonance Theory (ART) family of classifiers. The classifiers are two forms of adaptive resonant classifiers, which do not suffer from the train/test dichotomy that plagues most classifiers; they can switch between training and testing modes at any point. The classifiers are also not limited to binary classification, it is instead adapted to multiclass classification.

Figure 8:
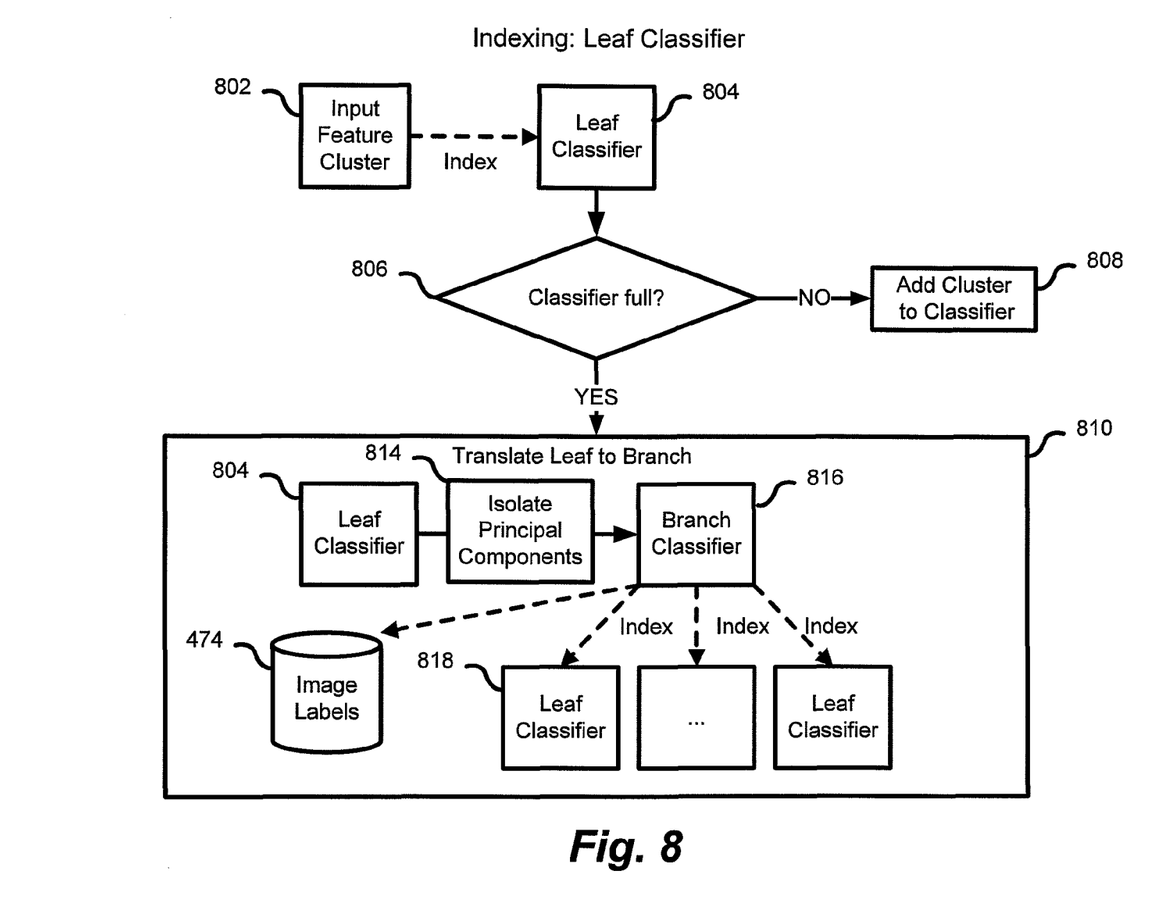
FIG. 8 shows a method of indexing images using a leaf classifier.

The first form of classifier is a leaf classifier, seen in FIG. 8. This classifier uses a combination of two layers linked by an associative map field in between. The first layer receives a stream of input vectors and performs comparisons using the hypercomplex comparison algorithm and the second layer receives a stream of correct predictions. When the two layers activate in resonance, the map field pairs their activation. The map field includes a feedback control mechanism which can trigger the search for another recognition category, in a process called match tracking. The classifier has the following properties which differentiate it from a standard ART classifier:

The classifier does not use bounded length input samples. Instead training and test samples are resonant hypercomplex feature descriptors which can have any number of children Training is done with a resonant operation performed on the resonant feature hierarchy itself The classifier is implemented on the GPU; all comparisons are done in a single render pass with O(M,N) comparisons of M known features to N input features When a predetermined maximum feature descriptor threshold has been reached, a leaf node isolates the principal components of its feature descriptor collection and reorganizes itself into a branch classifier The second form of classifier is the branch classifier, seen in FIG. 7. This classifier uses a collection of feature descriptors which represent the principal components of a given object class. Each principal component feature descriptor collection is linked to a child classifier, which can be either another branch classifier or a leaf classifier. An example of a branch classifier would be the "automobile" branch classifier which contains the principal component feature descriptors representing: "sports car", "station wagon", and "pickup truck". Each of these feature descriptor collections of principal components, when activated, indicates to the branch classifier which of its children should be engaged for further classification. The branch classifier serves to answer questions such as "does this image contain a sports car, a station wagon or a pickup truck?"

Figure 4:
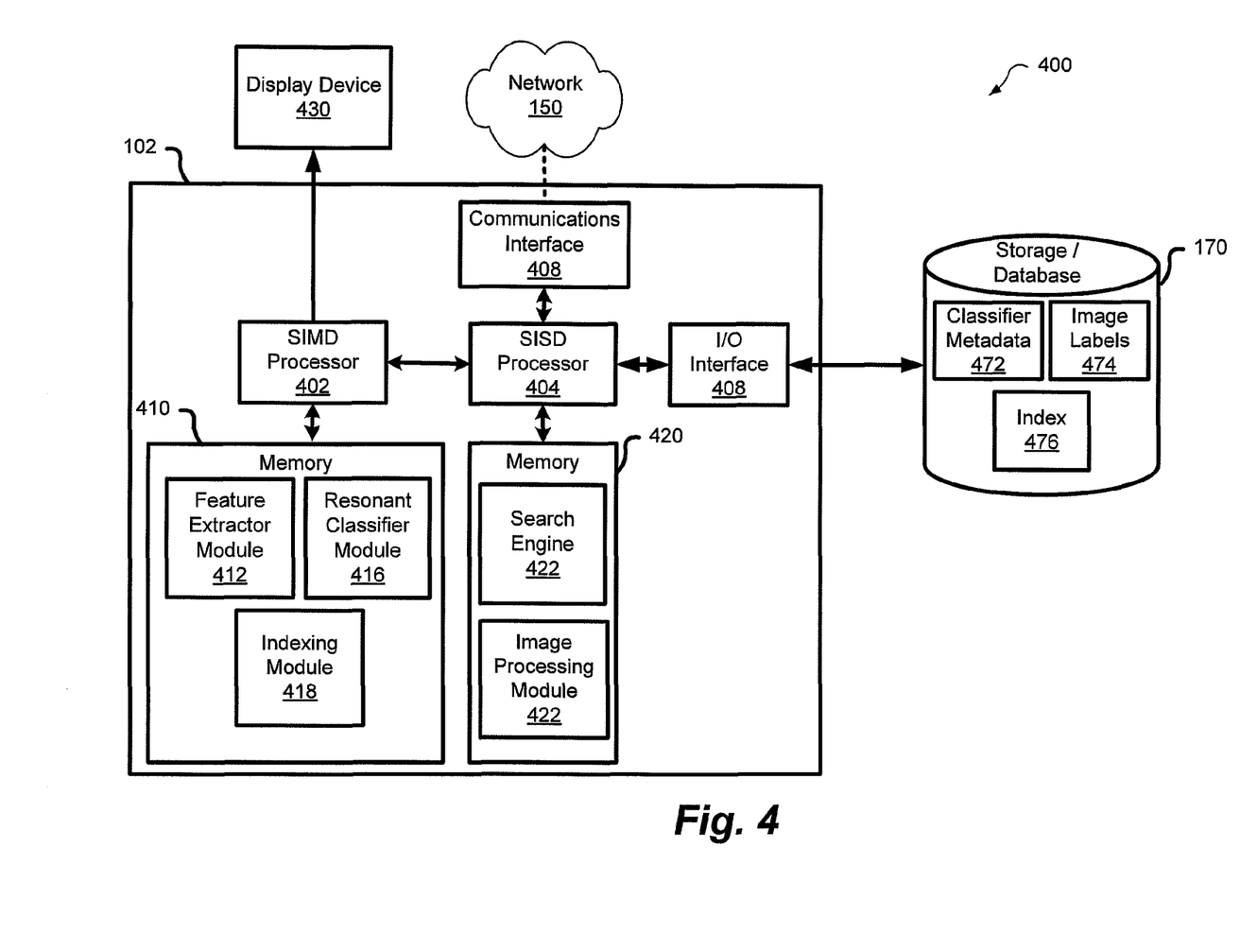
FIG. 4 shows a system for image classification and search.

FIG. 4 shows a computing environment 400 in which image classification and search may be implemented as computer software in the form of computer readable code for execution. The computing environment 400 may be any number of computing or computer based platforms such as servers, mobile devices, personal computers, notebook computers, personal digital assistants. The computer 102 comprises central processing unit (CPU) 404 and associated memory 120, and an SIMD processing unit (GPU) 402 and associated memory 410. The CPU(s) and GPU(s) may be a single processor or multiprocessor system for executing SISD or SIMD operations. In various computing environments, memory 402 and 404 and storage 170 can reside wholly on computer environment 400, or they may be distributed between multiple computers.

Input devices such as a keyboard and mouse may be coupled to a bi-directional system bus of a computer 402. The keyboard and mouse are for introducing user input to a computer and communicating that user input to processor 404 if required. Computer 102 may also include a communication interface 414. Communication interface 408 provides a two-way data communication coupling via a network link to a network 150 by wired or wireless connection or may provide an interface to other host devices by a direct radio frequency connection. In any such implementation, communication interface 408 sends and receives electrical, electromagnetic or optical signals which carry digital data streams representing various types of information. GPU 402 may be coupled to a display device 430 for displaying results or data related to search results or execution of the image processing or search engine.

Communication between the communication interface unit 408 and the network 150 or host use electrical, electromagnetic or optical signals which carry digital data streams. The signals through the various networks and the signals on network link and through communication interface, which carry the digital data to and from computer. The computer 402 may also be able to display the results of the search to a user in the form of output if it is performed locally.

The CPU 404 or SIMD processor (GPU) 402 or similar device may be programmed in the manner of method steps, or may be executed by an electronic system which is provided with means for executing for operation of the classification and search engine. The storage device 170 can be accessed through an input/output (I/O) interface 408 and may include both fixed and removable media, such as magnetic, optical or magnetic optical storage systems, Random Access Memory (RAM), Read Only Memory (ROM) or any other available mass storage technology. The storage device or media may be programmed to execute such method steps. As well, electronic signals representing method steps may also be transmitted via a communication network.

Memory 420 can provide code for high level operation of the classification and search system. An image processing module 422 provides a means of conveying images to the SIMD processor 402 for processing in addition to receiving metadata from user input or by other association means. The image is processed by the SIMD processor 402 which comprises a feature extractor module 412 for extracting and isolating feature descriptors and pooling simple features to hypercomplex feature descriptors, a resonant classifier module 416 for performing classification based upon resonant hierarchical hypercomplex feature descriptors, an indexing module 418 for indexing the image within the classifier hierarchy relative to the determined classifiers utilizing classifier metadata. From the processing of the image by the SIMD processor 402, classifier metadata 472 is stored in a database. As part of the classifier metadata, the parameters for extracting the feature descriptors may be included in addition it is also possible to include the actual feature descriptors. The database also provides and index 476 to the location of the image either locally or remotely on the network. In combination with image labels 474, the search engine 424 can process a query, either based upon an image or keywords to access the database for retrieval of relevant images and present the results to the user. Although the modules have been represented as being divided between SISD processor 404 and SIMD processor 402 memory 410 and 420, they may be wholly executed by either processor.

Figure 5:
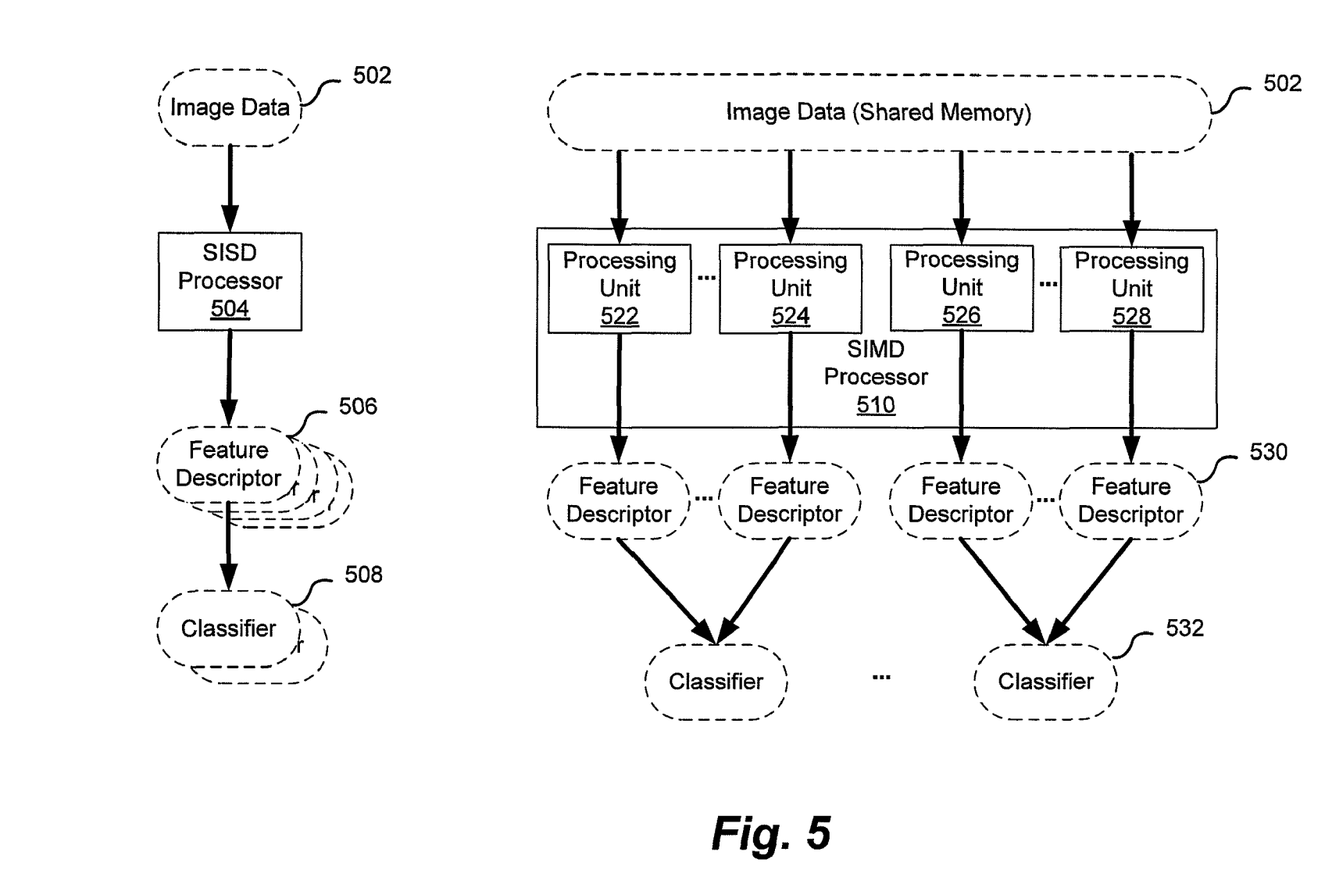
FIG. 5 shows a schematic representation of image analysis on SIMD and SISD processors.

FIG. 5 shows a schematic representation of image analysis on SISD processor 504 such as current CPU architectures or on SIMD processors 510 such as current GPU architectures. In an SISD processor each step of the execution of processing the image data 502 would be run serially. Feature descriptors 506 would be generated successively then appropriate classifiers 508 generated.

Modern programmable GPU 510 are fast becoming the ideal platform for large scale processing and provide SIMD execution, however newer CPU technology such as Cell processors are adopting the SIMD processing architectures. The GPU is ideal for problems that are highly parallel in nature and can benefit from Single Instruction Multi Data (SIMD), Multi Instruction Single Data (MISD) or Multi Instruction Multi Data (MIMD) processing. Since the primate visual cortex operates in a retinotopic fashion, which is an inherently SIMD type of processing, therefore current GPU architectures are ideal platform for modelling the visual cortex. All processing, from feature descriptor isolation and comparison to object classification, can be implemented using OpenGL GLSL fragment shaders. When developing algorithms for the GPU, coprocessor bandwidth can become a significant bottleneck. It is crucial to minimize data transfer between the CPU and GPU. Feature descriptors are only read from the GPU after the HAR layer has been applied. At this point, the features for a given object class have been isolated and ranked. A subset of these ranked descriptors are selected for classification. This allows a uniform distribution of feature descriptors for each class. These descriptors are combined into a single texture for the classification shaders. In this example the image data 502 is provided in shared memory which can be processed in parallel by processing units 522, 524, 526 and 528 to generate feature descriptors 530 in parallel. Classifiers 532 can then be generated based upon the feature descriptors.

Figure 6:
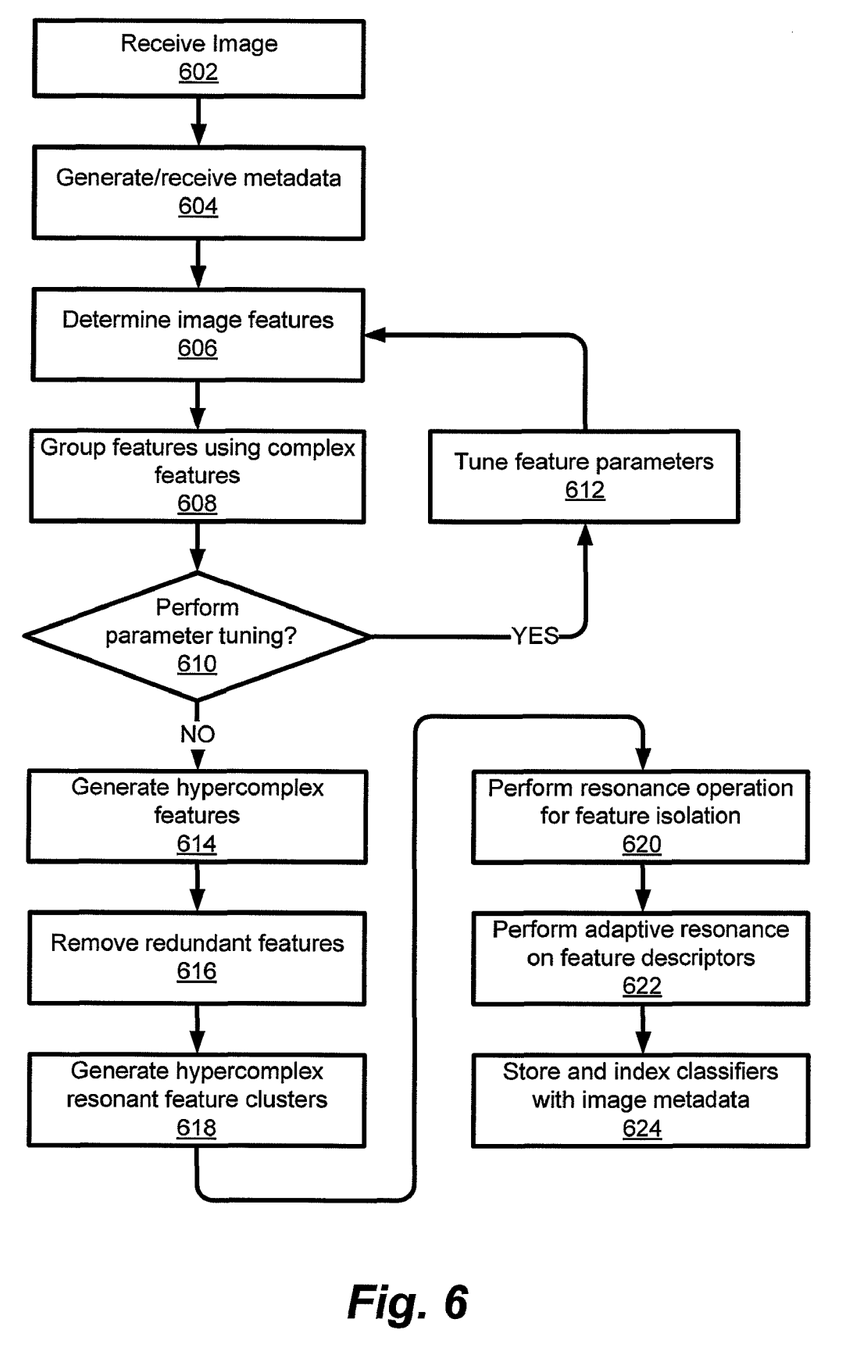
FIG. 6 shows a method of image analysis and indexing.

FIG. 6 shows a method of image analysis and indexing. The image is received by the processing computer at step 602. The image may either be sent to the computer or acquired from a remote location. Metadata can then be associated with the image either directly from user input or associated with the image by an automated process at step 604. At step 606 image is processor to determine simple feature descriptors utilizing Gabor filters. The determined image feature descriptors are grouped at step 608. The filter parameters can then be tuned based upon a predefined number of iterations or tuned until the optimal corner to edge ratio is achieved. If further parameter tuning is required, YES at step 610, the Gabor filter parameters are adjusted across the defined range and feature determination is repeated at step 606. If tuning is complete, NO at step 610, hypercomplex feature descriptors are then generated at step 614. By performing feature reduction by lateral inhibition at step 616, redundant features can be removed. It should be understood that reduction of overlapping features may occur throughout the method to improve efficient by removing redundant data. Hypercomplex feature descriptor clusters are then generated at step 618. A resonance operation is then performed at step 620 it effectively performs feature isolation prior to training the classifier. Adaptive Resonance Theory classifier is then determined at step 622 which places the image, based upon the determined classifier, within the hierarchy of images. The classifier metadata and image index information can then be stored with an image database at step 624.

Figure 7:
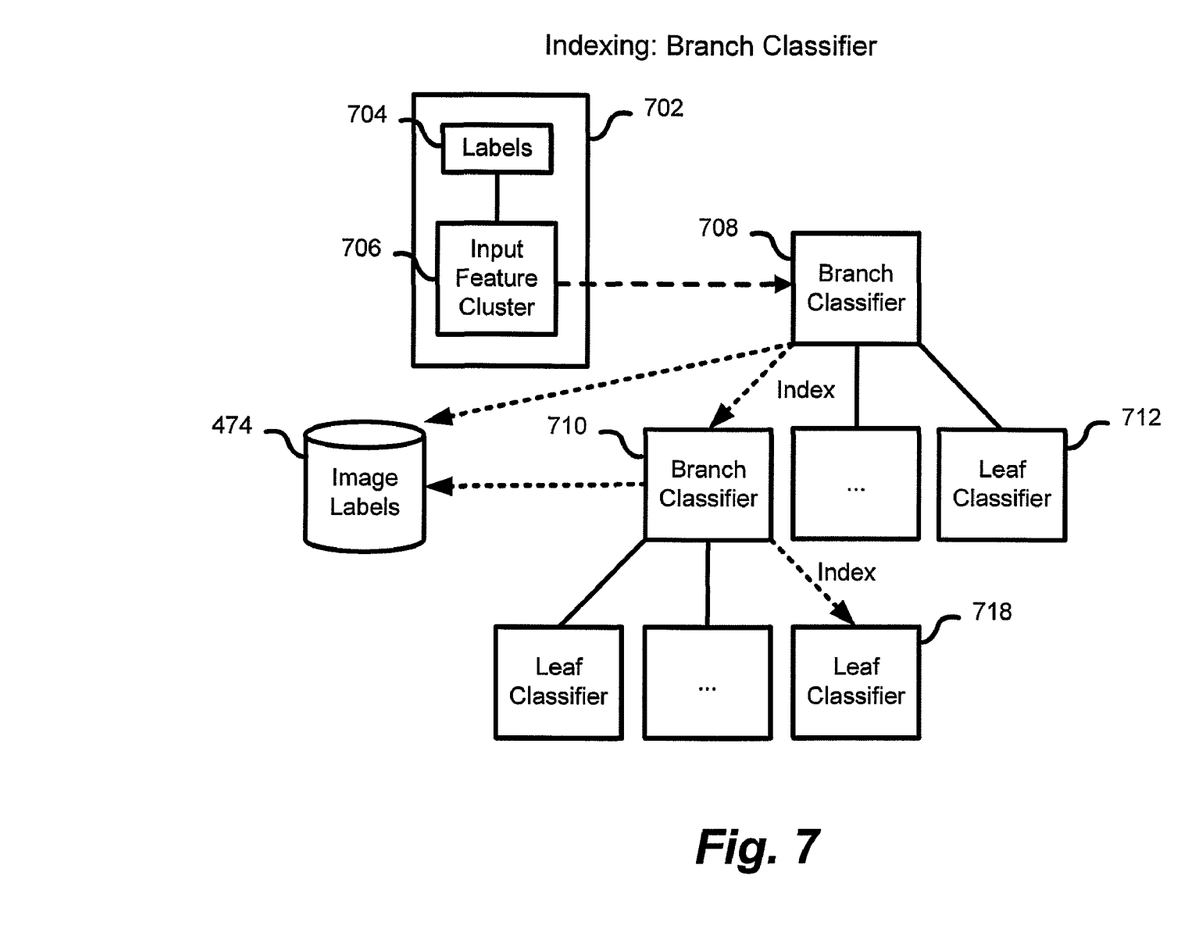
FIG. 7 shows a method of indexing images using a branch classifier.

FIG. 7 shows a method of indexing images using a branch classifier as defined during step 622 for creating the hierarchy. Data 702, associated with the processed image, includes labels 704 which identify characteristics of the image and the feature cluster 706 associated with the image. The feature cluster 704 is mapped with classifiers in an image database. The classifiers can be defined in a tree structure with the index's top level classifier mapping to branch classifier 708. For each branch classifier such as 708 and 710 image, labels 474 can be assigned and stored in the database to facilitate search based upon keywords. From each branch classifier additional branches may be defined, for example branch classifier 710 branches from branch classifier 708. Similarly leaf classifiers 712 and 718 may be dependent from the branch classifier as well. Each classifier is associated with clusters of features that are common to images and can be mapped together. For example, a top level branch classifier may be associated with images of vehicles, while a sub-branch define automobiles in particular, while the leafs may be associated with colors or shapes of automobiles.

FIG. 8 shows a method of indexing images using a leaf classifier. As with the branch classifier the leaf classifier is associated with a feature cluster 802 generated from the image. The feature cluster 802 is indexed to the individual leaf classifier 804. To ensure speed and manageability of the image database the size of each leaf classifier can be limited either in terms of the number of images references or by data size. When the defined limit is reach, the classifier is deemed full, YES at step 806. The leaf classifier 804 will be redefined as a branch classifier 816. At step 814 the principle components of the leaf classifier are isolated and translated to the branch classifier. The images that are part of the classifier are then redefined by further leaf classifiers 818 providing further granularity in image resolution. The images are re-indexed to the new leaf classifier and associated with the image labels 474 in the database.

Figure 9:
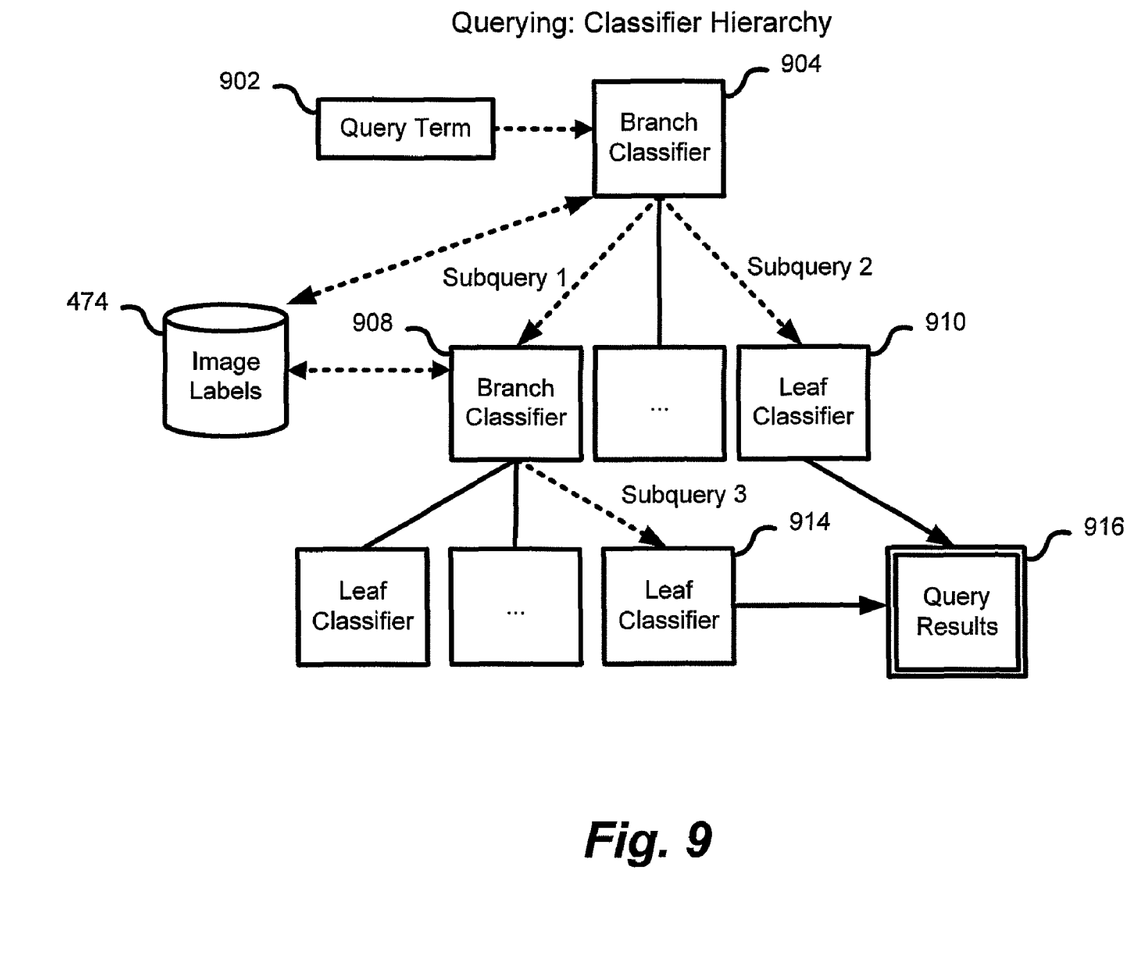
FIG. 9 shows a method of querying the classifier hierarchy.

FIG. 9 shows a method of querying the classifier hierarchy. When a search is performed on the database, the keywords that are associated with the classifiers are mapped back to the query term 902. For example a high level term (such as 'vehicle') can be associated with the main branch classifier 904. The additional terms that define a subqueries such as subquery 1 (such as 'car') which is mapped to a branch classifier 908 and subquery 2 (such as 'bus') which is mapped to a leaf classifier 910. In addition, dependent on the granularity of the branch classifier, additional terms may be mapped based upon additional subquery terms, such as subquery 3 (such as 'convertible') to further direct to a leaf classifier 914. Based upon the hierarchy the images associated with leaf classifiers the query result 916 can then be presented by the images associated with the particular leaf classifier.

Figure 10:
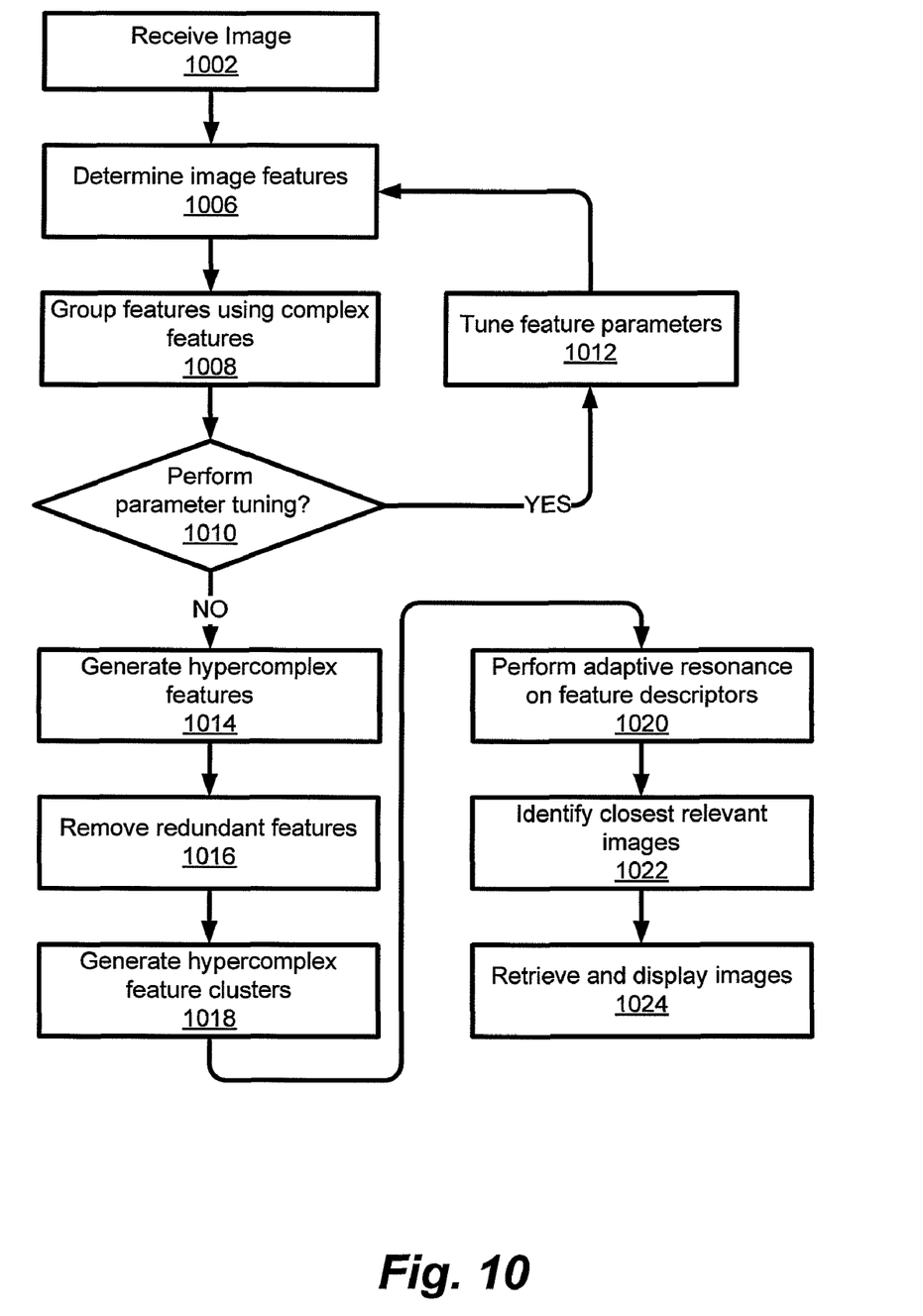
FIG. 10 shows a method of querying the classifier hierarchy based upon a received image.

FIG. 10 shows a method of querying the classifier hierarchy based upon a received image. In this method it is assumed that an image is provided as part of the search query. Search terms or keywords may also be included for accelerating the search process by further defining an initial classifier branch. The image is received by the processing computer at step 1002. The image may either be sent to the computer directly or acquired from a remote location. For example, an image may be provided by a mobile phone integrated with a camera, in which the user would like to find similar products or locations. At step 1006 image feature descriptors are determined utilizing Gabor filters. The determined image features are grouped at step 1008. The filter parameters can then be tuned based upon a predefined number of iterations or tuned until the optimal corner to edge ratio is achieved. If further parameter tuning is required, YES at step 1010, the Gabor filter parameters are adjusted across the defined range and feature determination is repeated at step 1006. If tuning is complete, NO at step 1010, hypercomplex feature descriptors are then generated at step 1014. By performing feature reduction using lateral inhibition at step 1016, redundant features can be removed. Hypercomplex feature descriptor clusters are then generated at step 1018 by pooling hypercomplex feature descriptor. Adaptive Resonance Theory classifiers can then determined at step 1020 which places the image based upon the determined classifier within the hierarchy of indexed images. The images that are most relevant are then identified at step 1022 and then retrieved and displayed at step 1024. If the user then selects one of the retrieved images, a further search can be performed to retrieve images that are more similar based upon the classifiers associated with that image.

Application code may be embodied in any form of computer program product. A computer program product comprises a medium configured to store or transport computer readable code, or in which computer readable code may be embedded. Some examples of computer program products include but are not limited to Compact Disc and Digital Versitile Disc, memory cards, floppy disks, magnetic tapes, computer hard drives, or servers on a network.

The computer systems described above are for purposes of example only. An embodiment may be implemented in any type of computer system or programming or processing environment. It will be apparent to persons skilled in the art that a number of variations and modifications can be made without departing from the scope of the invention as defined in the claims.

The method steps may be embodied in sets of executable machine code stored in a variety of formats such as object code or source code. Such code is described generically herein as programming code, or a computer program for simplification. Clearly, the executable machine code or portions of the code may be integrated with the code of other programs, implemented as subroutines, plug-ins, add-ons, software agents, by external program calls, in firmware or by other techniques as known in the art.

The embodiments described above are intended to be illustrative only. The scope of the invention is therefore intended to be limited solely by the scope of the appended claims.

The invention claimed is:

1. A method classifying an image comprising the steps of:
   determining a plurality of simple feature descriptors based upon characteristics of the image;
   grouping simple feature descriptors into complex features wherein the simple feature descriptors are grouped based upon orientation;
   grouping end-stopped complex feature descriptors and complex feature descriptors at multiple orientations into hypercomplex feature descriptors;
   generating a hypercomplex resonant feature descriptor cluster by linking pairs of hypercomplex feature descriptors;
   performing feature hierarchy classification by adaptive resonance on feature descriptors; and
   generating classifier metadata associated with the image.

2. The method of claim 1 further comprising the steps of:
   determining redundant feature descriptors which overlap; and
   removing the redundant feature descriptors.

3. The method of claim 1 wherein the simple feature descriptors are determined by applying Gabor filters to the image.

4. The method of claim 3 wherein the step of determining the feature descriptors is repeatedly performed to determine optimal feature descriptor acquisition parameters of the Gabor filters.

5. The method of claim 1 further comprising the step of:
   performing hierarchical feature resonance against images already classified for a given object class, and utilizing the determined feature descriptors prior to the step of hierarchical classification.

6. The method of claim 5 further comprising the steps of:
   storing classification metadata in an image database; and
   storing index information for identifying the location of the image.

7. The method of claim 6 further comprising the step of storing image label information in the image database wherein the image label comprises keywords associated with the content of the image.

8. The method of claim 1 further comprising retrieving images from an image database having classifiers of the same classification metadata for display to a user.

9. The method of claim 1 wherein the classifiers are grouped into branch classifiers and dependent leaf classifiers in an image hierarchy database.

10. The method of claim 9 wherein when a classifier exceeds a pre-defined number of referenced images, performing the steps of:
    isolating multiple principal feature descriptor components of the original leaf classifier into a new branch classifier; and
    generating new leaf classifiers based upon the differential feature descriptors of the original leaf classifier.

11. The method of claim 1 wherein each of the plurality of feature descriptors is determined independently by a processing unit operating capable of Single Instruction Multi Data (SIMD) processing.

12. A system for image classification and searching comprising:
    a processor;
    a memory containing instructions for:
    a feature extractor module for:
    determining a plurality of feature descriptors based upon characteristics of the image;
    grouping feature descriptors into complex features wherein the feature descriptors are grouped based upon orientation;
    grouping end-stopped complex features and complex features at multiple orientations into hypercomplex features;
    generating a hypercomplex resonant feature cluster by linking pairs of hypercomplex features;
    a resonant classifier module for:
    performing feature hierarchy classification by adaptive resonance on feature descriptors;

generating feature image classifiers based upon the adaptive resonance classifiers;
an indexing module for indexing the image within the classifier hierarchy;
a storage device containing an image database comprising:
classifier metadata associated with images;
indexing data comprising image location data.

13. The system of claim 12 wherein the storage device further comprises image labels comprising keywords associated with content of the images.

14. The system of claim 12 wherein a Single Instruction Multi Data (SIMD) processor and the feature extractor module operates by utilizing processing units for determining features in parallel.

15. The system of claim 12 wherein the feature extractor module further comprises performing hierarchical feature resonance over all visual fields for a given object class.

16. The system of claim 12 wherein the classifier metadata is stored in a branch/leaf hierarchy, each branch associated with images having similar principal components based upon the feature descriptors and the leaf classifiers reference images based upon differential feature descriptors relative to the branch.

17. The system of claim 16 wherein when a classifier exceeds a pre-defined number of referenced images the hierarchy is expanded by:
isolating multiple principal feature descriptor components of the original leaf classifier into a new branch classifier; and
generating new leaf classifiers based upon the differential feature descriptors of the original leaf classifier.

18. A system for image classification and searching comprising:
a processor;
a memory containing instructions comprising:
determining a plurality of simple feature descriptors based upon characteristics of the image;
grouping simple feature descriptors into complex features wherein the simple feature descriptors are grouped based upon orientation;
grouping end-stopped complex feature descriptors and complex feature descriptors at multiple orientations into hypercomplex feature descriptors;
generating a hypercomplex resonant feature descriptor cluster by linking pairs of hypercomplex feature descriptors;
performing feature hierarchy classification by adaptive resonance on feature descriptors; and
generating classifier metadata associated with the image.

19. A non-transitory computer readable medium containing instructions for image classification, the instructions which when executed on a processor perform the steps of:
determining a plurality of simple feature descriptors based upon characteristics of the image;
grouping simple feature descriptors into complex feature descriptors wherein the simple feature descriptors are grouped based upon orientation;
grouping end-stopped complex feature descriptors and complex feature descriptors at multiple orientations into hypercomplex feature descriptors;
generating a hypercomplex resonant feature descriptor cluster by linking pairs of hypercomplex feature descriptors;
performing feature hierarchy classification by adaptive resonance on feature descriptors; and
generating classifier metadata associated with the image.

* * * * *